United States Patent [19]

Tarsia

[11] 4,433,910
[45] Feb. 28, 1984

[54] TRANSPARENCY HOLDER

[75] Inventor: Giuseppe Tarsia, Valley Stream, N.Y.

[73] Assignee: Berkey Photo, Inc., White Plains, N.Y.

[21] Appl. No.: 349,772

[22] Filed: Feb. 18, 1982

[51] Int. Cl.³ .............................................. G03B 27/62
[52] U.S. Cl. ...................................................... 355/76
[58] Field of Search .................................... 355/75, 76

[56] References Cited

U.S. PATENT DOCUMENTS

| | | |
|---|---|---|
| 505,331 | 9/1893 | Scouler . |
| 1,885,286 | 11/1932 | Petit et al. . |
| 2,294,585 | 9/1942 | Thomson ............................. 355/75 |
| 2,369,897 | 2/1945 | Hjort . |
| 2,427,554 | 9/1947 | Drucker ................................ 355/76 |
| 2,498,278 | 2/1950 | Kaplowitz . |
| 2,589,680 | 3/1952 | Denny ................................... 355/75 |
| 2,625,864 | 1/1953 | Engelhardt . |
| 3,194,114 | 7/1965 | Weinberg . |
| 3,203,311 | 8/1965 | Woodcock et al. . |
| 3,288,023 | 11/1966 | Lane ...................................... 355/76 |
| 3,288,027 | 11/1966 | Ruzicka ................................. 355/75 |
| 3,604,328 | 9/1971 | Nakagawa ............................ 355/75 |
| 3,988,063 | 10/1976 | McNair et al. ........................ 355/75 |
| 4,095,894 | 6/1978 | Holliday ................................ 355/75 |
| 4,136,948 | 1/1979 | Prochnow . |
| 4,161,365 | 7/1979 | Anderson et al. .................... 355/75 |
| 4,188,115 | 2/1980 | Marvin ................................. 355/75 |
| 4,227,804 | 10/1980 | Pramstraller . |
| 4,241,993 | 12/1980 | Guillaume ............................ 355/75 |
| 4,334,768 | 6/1982 | Parik ..................................... 355/75 |

FOREIGN PATENT DOCUMENTS 97726 12/1939 Sweden .

Primary Examiner—Monroe H. Hayes
Attorney, Agent, or Firm—Neuman, Williams, Anderson & Olson

[57] ABSTRACT

An improved transparency holder is provided for use in supporting and positioning a transparency in a light and image projection apparatus, such as a photographic enlarger. It includes a pair of opposed carrier plates having an aperture for coaxial alignment with a light beam. Disposed therein are mask means, which are another pair of opposing apertured plates for releasably holding the transparency therebetween in coaxial alignment with the light beam. The mask means are positioned by registry pin and hole means, and releasably retained thereat by magnetic means. A cassette means also defines an aperture for coaxial alignment with the light beam and is adapted to removably receive the carrier means. Moveable wedge means are externally accessible from the cassette and cooperate with the mask means for selectively releasing the transparency for movement. Bias means within the cassette compresses the mask means to hold the transparency in clamped engagement when the carrier is in the cassette.

11 Claims, 5 Drawing Figures

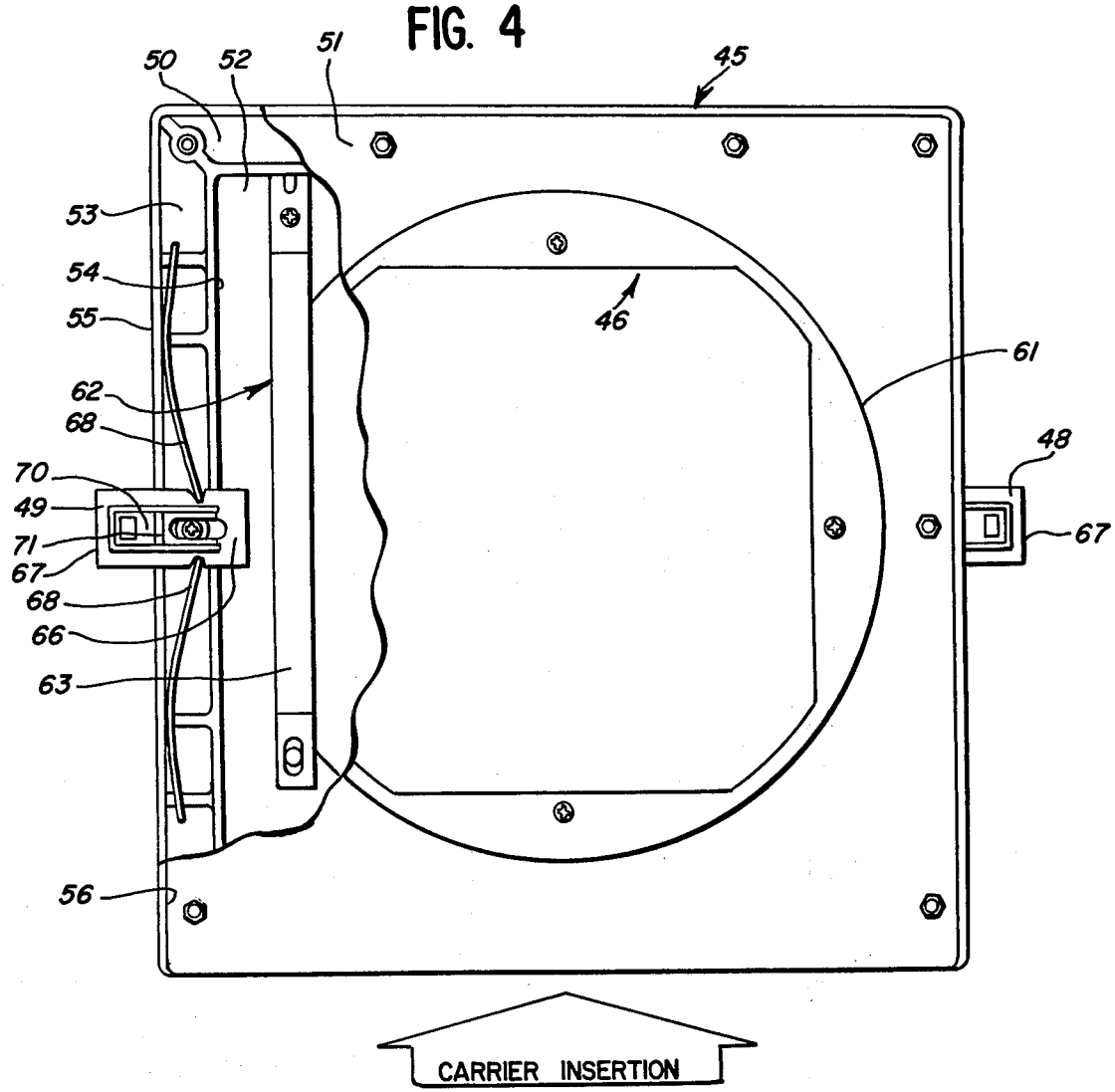

TRANSPARENCY HOLDER

BACKGROUND OF THE INVENTION

This invention relates generally to a holder for positioning a transparency in a light beam. For instance, such a holder may be used to position a photographic negative between a light source and focusing lens on an enlarger, the negative being used to generate an image on a photosensitive paper for preparing a print or the like. In order to obtain the best possible projected image, it is desireable to maintain the negative flat in a focusing plane for the projection lens, eliminate any distortion from dirt or glass that might occupy the optical path, yet still be able to conveniently adjust the position of the transparency with respect to the optical path.

In the past, transparency holders have sandwiched the transparency between two sheets of glass that were compressed by the weight of a vertically slideable lamp house. Glass was found to distort the transparency image due to optical imperfections, collect dirt and dust, and scratch the delicate transparency surface. In addition, unless the glass was secured to a surrounding frame, it had a tendency to scoot or slide, disaligning the transparency and scratching its surface.

With improvements in the structural characteristics of transparencies, and the increasing popularity of strip film, it became desireable to minimize any contact with the image area of the transparency and limit its supporting contact to the edges thereof. This has been accomplished by a pair of opposed metal plates to grip and maintain the transparency edge. The plates were held in gripping compressed relation by the gravitational weight of the superposed lamp house, and were usually removeable from the projector only by raising the lamp house. Thus, in order to advance a film strip without scratching its surface, it was necessary to lift the lamp house, remove and open the carrier, reposition the transparency strip, close and replace the carrier, and lower the lamp house. If the transparency was misaligned, it was necessary to repeat the operation. Not only was this procedure time consuming and cumbersome, the constant movement of the lamp house imparted relatively severe shocks to a fragile and expensive lamp, reducing its life expectancy. Still further, each time the lamp house was raised or the transparency carrier was removed, light could be emitted by the projector, possibly ruining photosensitive materials.

With still further improvements in transparencies and their image resolution capabilities, a wide variety of film sizes and formats became available for use. However, this necessitated that the user also purchase or obtain a large number of transparency holders or masks that corresponded in size to the transparency projected.

SUMMARY OF THE INVENTION

Accordingly, it is an object of the present invention to provide an improved transparency holder which overcomes the aforementioned problems and is suitable for use in a projector.

It is a further object of the present invention to provide an improved transparency holder that maintains the transparency planar without the use of glass or other possibly image distorting or transparency scratching means.

It is a still further object of the present invention to provide an improved transparency holder that releasably retains the transparency so that it may be moved or adjusted without removing the holder from the projector.

It is a still further object of the present invention to provide a transparency holder that may be removed from the projector without the necessity of moving the lamp house.

It is a still further object of the present invention to provide a transparency holder that will simply and conveniently accommodate single transparencies, strips of transparencies, and a variety of transparency and mask sizes.

Further and additional objects will become apparent from the description, accompanying drawings, and appended claims.

In accordance with an embodiment of the invention, a transparency holder is provided for use in a projection apparatus having an optical axis that includes a carrier means of two opposing apertured plates. Mask means of two opposing apertured plates may be selectively interposed between the carrier plates, and they are adapted to releasably compressibly hold a transparency therebetween. An aperture defining cassette means is provided to receive the carrier means, and it includes a wedge means for selectively releasing the transparency from the mask and carrier means. By coaxially aligning the apertures of the carrier means, mask means, and cassette means, the transparency may be adjustably positioned in the optical path or removed therefrom without removing the carrier means from the cassette means, and the transparency may further be removed from the optical path without moving the light source.

BRIEF DESCRIPTION OF THE DRAWINGS

FIG. 4 is a bottom plan view of one embodiment of the cassette means of the present invention showing in partial cutaway the interior cavity adapted to receive the carrier means.

FIG. 5 is a side plan view of the cassette means of FIG. 4 illustrating the opening into which the carrier means is inserted.

DESCRIPTION OF THE ILLUSTRATED EMBODIMENT

Figure 1:
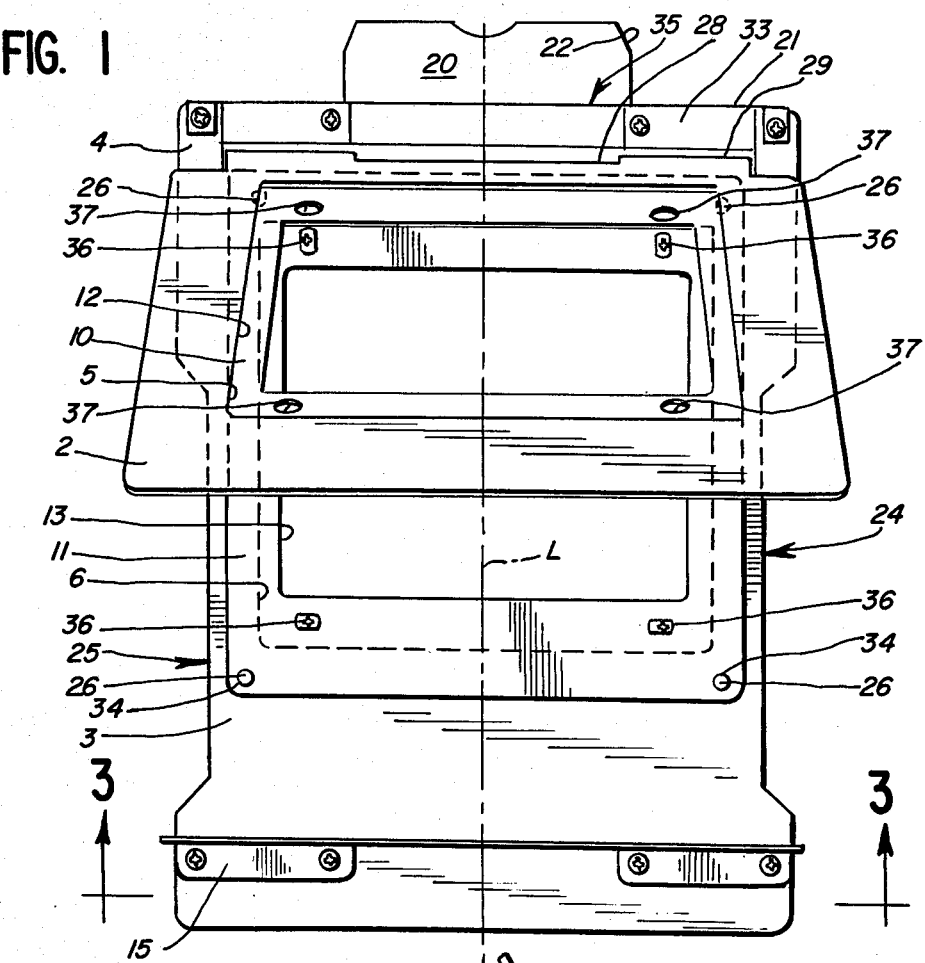
FIG. 1 is a perspective view of one embodiment of the transparency holder of the present invention showing the carrier means in an open position with the mask means in place. This view shows the bottom carrier plate and bottom mask plate in a top plan view, and the upper carrier plate and upper mask plate in an elevated perspective view.
Figure 2:
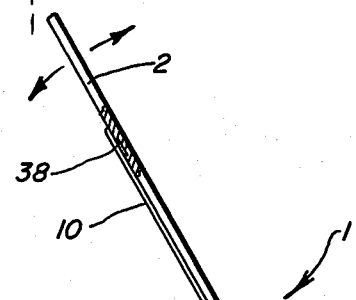
FIG. 2 is a side plan view of the transparency holder of FIG. 1, with two cutaway view portions.
Figure 3:
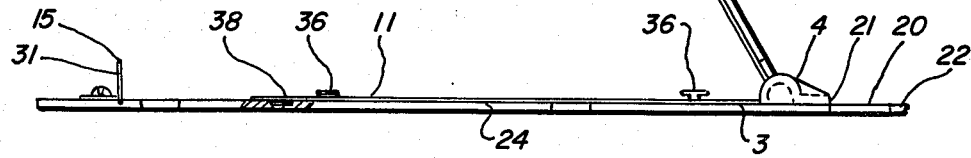
FIG. 3 is a section view of FIG. 1 taken along line 3—3 illustrating a bracket and film slot.
Figure 3:
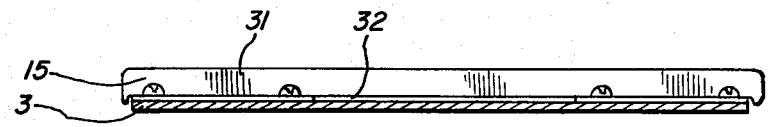

Referring now to FIGS. 1 and 2, an improved negative carrier 1 includes two generally planar opposing plates 2 and 3 connected at one edge by a hinge means 4. Each plate has an aperture 5, 6 therein, said apertures being coaxially aligned when the plates are in their closed, compressing state. One of a pair of unconnected generally planar opposing mask plates 10, 11 is releasably retained in parallel interior face to face contact with one of each of the carrier plates 2, 3. Like the carrier plates, each mask plate has an aperture 12, 13 therein, said apertures being coaxially aligned when the mask plates are suitably positioned and the carrier plates are in their closed state. A bracket 15 is attached transversely to one surface of carrier plate 3 opposite the hinged end thereof.

The lower carrier plate 3 comprises a relatively stiff planar sheet of metal or the like having a generally rectangular shape and a longitudinal axis L. A coplanar tongue 20 that is preferably integral with the carrier plate 3 extends longitudinally beyond the leading plate edge 21, adjacent the hinge 4. The tongue has beveled corners 22 to assist in positioning the carrier as the tongue is inserted into a complementary slot in the cassette means, as described later herein. A pair of transverse cutouts 24 and 25, one along each side of the carrier plate 3, result in a slight hourglass shape. The aperture 6 defined by the carrier plate 3 is, in the illustrated embodiment, substantially rectangular. Its dimensions are preferably slightly larger than the dimensions of the largest size transparency contemplated for use therein. This aperture, as with the apertures in the other carrier plate 2, the apertures in the mask plates 10, 11, and the later described apertures in the cassette means are all positioned so as to be coaxially aligned with the optical path of the projection means when each component is in its intended location. A plurality of registry pins 26 extend generally perpendicular to the carrier plate 3 towards the opposite carrier plate 2. They are disposed adjacent the periphery of the aperture 6, there being one proximate each corner of the aperture.

The upper carrier plate 2 is of similar construction to the lower carrier plate 3. It is preferably a relatively stiff planar sheet having a generally rectangular shape, but with a shorter length along its longitudinal axis L than the opposing carrier plate 3. The plate aperture 5 is substantially rectangular. Hinge means 4 of any convenient or conventional design connect the upper and lower plates adjacent the leading edge 21. Preferably, for reasons made clear hereinafter, the hinge means should be somewhat "loose" to permit minor vertical, face-to-face carrier plate separation. A small notch 28, extending transverse to the longitudinal axis of the lower plate 3, is defined at the leading edge 29 of the upper carrier plate. Its dimensions correspond approximately to those of the cross section of a 35mm film strip so that when the upper plate 2 is raised, as illustrated, a film strip may be passed through the slot defined by the notch 28 and lower carrier plate 3. The upper carrier plate has no transverse cutouts corresponding to those in the lower plate at 24, 25, thus, when the upper plate overlies the lower plate, one may easily separate the two by urging upwardly that portion of the upper plate extending laterally outward of the cutouts 24. A plurality of registry pins, not illustrated but substantially identical to those illustrated for the lower plate 3, likewise extend generally perpendicularly to the upper plate 2 towards the opposite carrier plate 3. They too are disposed adjacent the periphery of the aperture 5.

A bracket 15 having an L-shaped cross section has one face thereof attached to that portion of the lower plate 3 that is not overlain when the two carrier plates are in their closed, opposed positions. The bracket is mounted transverse to the longitudinal axis L and may be attached by any convenient means. The upstanding portion 31 includes a small transversely extending notch 32. As with the notch 28 in the uppper plate 2, its dimensions correspond approximately to those of the cross section of a 35mm film strip, so that such a strip may be passed through the slot defined by the notch 32 and carrier plate 3.

A strap 33 extends transversely across the carrier plate 3 in contacting relation therewith, the strap being in alignment with the leading edge 21 of the carrier plate. It has a transversely extending raised portion 35 that cooperates with the carrier plate to form a slot in the same manner and of the same dimension as the slot formed by the bracket 15. The strap may be attached by any convenient means.

The lower mask plate 11 comprises a relatively stiff planar metal sheet having a generally rectangular shape and a generally rectangular aperture 13. The aperture is preferably sized to coincide with the image area of a transparency of a given size. A plurality of holes 34 are disposed one at each corner, or as necessary, to fit over the registry pins 26 to locate the mask plate with respect to the carrier plate 3. The holes 34 and registry pins 26 are preferably symmetrically located so that the mask may be rotated 90°, 180°, 270°, or any other convenient amount, and still utilize the registry pins as locating means. The thickness of the mask may be selected as desireable, provided that the registry pins 26 do not extend above the surface thereof. The lower mask plates may further include a plurality of alignment pedestals 36 having a generally T-shaped cross sectional configuration. Each pedestal extends perpendicular to the mask plate to retain the edge of a transparency thereunder. The distance from the mask surface to the underside of the lip of a pedestal is approximately the same as the thickness of a conventional transparency.

The upper mask plate 10 is substantially identical to the lower mask plate 11 regarding its shape, dimensions, and aperture size and location. However, rather than having alignment pedestals 36, it has corresponding ports 37 to receive the pedestals 36 aligned therewith.

Each of the mask plates 10 and 11 is releasably retained in parallel surface contact with its respective carrier plate by magnetic material 28 imbedded in the carrier plate underneath the mask plate. Other releaseable retention means are suitable, provided they permit easy mask removal yet retain the mask in registration over the pins 26 when the carrier is opened. This allows the user to swiftly change masks as necessary to accommodate a different size transparency or as desireable to achieve an artistic effect.

In use, the closed carrier plates are opened by lifting the top plate 2 near the cutout 24 in the lower plate 3. Once opened, an appropriate set of mask plates 10, 11 are placed in the desired orientation with their alignment holes 34 positioned by the retention pins 26. Each mask plate is releasably retained by attraction to the magnetic strips 38 embedded in the carrier plates. A single transparency may be placed on the lower mask plate 11, being positioned by the pedestals 36 and having its edges restrained under the lips thereof. The masks 10, 11 illustrated in FIG. 1 are appropriate for what is commonly referrd to as a size 2¼" by 2¼" negative, which is larger than a 35mm negative. The transparency carrier may be prepared to accept a 35mm transparency by removing the illustrated mask plates and substituting those having appropriately sized apertures. A single negative may then be placed and positioned on the lower mask plate as noted above, or a strip of transparencies may be inserted by passing it through the bracket slot 32, over the lower mask plate, and out the slot defined by the raised strap portion 35 and the carrier plate 2. Once the desired transparency is positioned, or threaded therethrough, the carrier plates may be closed to releasably retain the transparency in position.

Referring now to FIGS. 4 and 5, a cassette means 45 defines an aperture 46 for coaxial alignment with the projector optical axis OA. An interior cavity 47 is defined by the cassette and is adapted to receive the closed carrier means of FIGS. 1 and 2 through an access port 47A. A pair of reciprocally mounted oppositely disposed wedge means 48, 49 are adapted to selectively protrude into the cavity to relieve the compressive force holding the transparency between the mask means as necessary or desireable.

The cassette means 45 comprises two mating members 50 and 51 sandwiched together and held in position by conventional fasteners to define the carrier receiving cavity 47 therebetween. Housing element 50 is generally rectangular and pan-shaped, including a planar bottom portion 52 surrounded on three sides by relatively short side walls 53 disposed around the periphery of the bottom portion. The side without such a wall cooperates with the cover element 51 to define the access port 47A. Each side wall has a generally flat inner surface 54 to assist in the insertion and positioning of the carrier means 1, and a generally flat outer surface 55. Cover element 51 is a generally flat plate that cooperates with the side walls 53 to define the carrier means receiving cavity 47. Preferably, the cover element fits into a notch 56 around the perimeter of the side walls where the two meet to provide a non-linear light tight barrier between the cavity 47 on the interior of the cassette and the exterior of the cassette. The cover may be fixed in place by fasteners, as illustrated, or a suitable adhesive. The cassette aperture 46 is centrally located but may be positioned as is convenient, and the cassette mating members may be formed of a plastic material.

Referring to the exterior of the cassette 45, both the housing element 50 and the cover element 51 have a raised annular protrusion 60, 61 that is preferably concentric with the optical axis of the projector. This operates as a locating ring to maintain the cassette in alignment with the optical axis and forms a light tight seal, yet permits rotation of the cassette and the inserted transparency as desired.

Referring to the interior of the cassette means, bias means 62 is provided to urge the inserted carrier means into face-to-face relation against an interior flat surface of the housing cover element 51. Alternatively, the bias means could be provided to urge the carrier means into contact with the housing element bottom portion 52. As illustrated, the bias means is a pair of bowed longitudinal leaf springs 63 aligned in the direction of carrier means insertion. One end is fixedly attached and the other end is slideably attached to the housing element.

Wedge means 48, 49 aligned transversely to the direction of carrier insertion extend from the exterior of the cassette into its interior cavity 47. Each is disposed in sliding relation thereto and forms a generally light tight seal therewith. Each wedge means includes a tapered carrier contacting ramp portion 66 disposed within the cavity 47. The opposite operated end portion 67 is outside the cassette housing 50 for ease of access by the operator. Bias means 68, illustrated as deformed music wire having one end fixed to the cassette housing, urges the wedge means 48, 49 away from the interior of the cavity 47. This bias may be overcome by manually pressing inwardly the operated end portion 67. Depressible detent means 70 include an upstanding interferring tang 71 that may slide underneath a stop 72 and latch in interferring contact therewith to overcome the force of the bias means 68 and retain the wedge in its inner position, protruding more deeply into the cavity 47. Pad 73 is operatively attached to the tang 71 so that it may be selectively depressed to move the tang underneath and out of interferring contact with the stop 72, thereby causing bias means 68 to return the wedge to its retracted position.

Referring to FIG. 5, the housing element 50 has a notch 75 in the wall opposite the access port 47A. Said notch, together with the cover element 51, provides an exit port 75A having a width slightly larger than the width of the carrier means tongue 20 and a height in the direction of the optical axis slightly greater than the combined cross sectional height of the tongue 20 and a strip of film, not shown.

In operation, the cassette means 45 is positioned in a projector between the light source and focusing lens, with its aperture 46 coaxial to the optical axis. The raised annular protrusions 60, 61 assist in retaining the cassette means in position and permit it to rotate. With the wedge means 67 retracted, a carrier means 1, with a pair of mask means and single transparency therebetween, is inserted tongue end first, into the access port 47A. The interior side wall surfaces 54 of the cassette cavity 47 align the cassette means as it is inserted, and the bias means 62 urges the cassette into face-to-face contact with the interior surface of the cover element 51. This action also compresses the opposing carrier plates 2, 3 and opposing mask plates 10, 11 to compressively hold the transparency therebetween. The tongue 20 passes through the exit port 75A until the leading carrier plate edge 21 abuts the interior surface of the side wall opposite the access port 47A. The upstanding portion 31 of the bracket 15 simultaneously abuts in light tight relation the side portion of the housing element 50 that defines the access port 47A. This portion of the bracket may extend upwardly an additional convenient amount to act as a grip to remove the carrier means. Thus, the carrier means is finally positioned, having its apertures and the transparency therein coaxial with the optical axis OA.

If a film strip has been inserted into the carrier means 1, it may extend beyond the leading edge of the tongue 20 and trail behind the carrier means through the bracket slot 32. As with the single transparency just described, the film strip is compressed and held between the mask means. To advance the film strip it is necessary to release the compressive hold of the mask means. This is done by pressing against the operated ends 67 of each of the wedge means 48, 49 to overcome the force of the bias means 68 and move the wedge means inwardly. The tapered contacting ramp 66 contacts the underside of the upper carrier plate 2, accessible via the cutout portion 24 in the lower carrier plate 3, to separate the carrier plates and the releasably attached mask means 10, 11. With the compressive hold on the transparency strip released, it may be moved as desired, being guided by the bracket slot 32, the alignment pedestals 36, and the exit port 75A. Once a transparency is selectively positioned, the depressible detent pad 73 on each wedge means 48, 49 may be depressed, releasing the tang 71 from interference with the stop 72, causing the bias means to return each wedge means to its retracted position. This also permits the leaf spring 63 to recompress the carrier means.

The carrier means may be removed by pulling it out of the cassette means 45, without the need of raising the light source.

As with the alternative embodiments disclosed herein, it is apparent that the invention is capable of various modifications in size and shape to accommodate various projectors and transparencies, as would be obvious to one skilled in the art, having the benefit of the foregoing disclosure and teachings. Accordingly, while the invention disclosed herein has been described with reference to an illustrated embodiment of the presently contemplated best mode for practicing the invention, it is to be understood that this disclosure is to be interpreted in its broadest sense and to encompass the use of equivalent apparatus and mechanisms.

What is claimed is:

1. A transparency holder comprising carrier means of two opposing apertured plates, said apertures positioned for coaxial alignment with a light beam, mask means of two opposing apertured plates adapted for releasably compressibly holding therebetween a transparency, said mask means adapted to be selectively interposed between said carrier means plates in predetermined locations by positioning means, said mask means apertures positioned for coaxial alignment with the light beam, cassette means adapted to removably receive said carrier means and defining an aperture positioned for coaxial alignment with the light beam, movable wedge means attached to and externally accessible of said cassette means for selectively releasing said compressive hold of said mask means on said transparency, whereby said transparency may be adjustably positioned in said optical path without removing said carrier means from said cassette means.

2. The transparency holder of claim 1 wherein said carrier means comprises two plates in edge hinged relation.

3. The transparency holder of claim 1 wherein said mask positioning means includes registry pins and apertures to maintain in coaxial relation the apertures of said mask means and said carrier means.

4. The transparency holder of claim 1 wherein releaseable attachment means secures said masks to said carrier means.

5. The transparency holder of claim 4 wherein said releaseable attachment means is magnetic.

6. The transparency holder of claim 1 wherein said cassette means includes bias means to operatively compress said carrier means and said mask means to hold a transparency therebetween when said carrier means is received in said cassette means.

7. The transparency holder of claim 1 wherein said cassette means includes internal carrier containment means to maintain in coaxial relation the apertures of said mask means, carrier means and cassette means.

8. The transparency holder of claim 1 wherein said cassette means includes external locating means to maintain in coaxial relation the cassette aperture and said light beam.

9. The transparency holder of claim 1 wherein said cassette means is incompressible.

10. The transparency holder of claim 1 wherein said wedge means comprises a bistable slide means moveable from a retracted mask means compression mode to an extended mask means separation mode.

11. The transparency holder of claim 10 wherein said slide means comprises a portion to contact one of said carrier means, separating it from the other of said carrier means.

* * * * *